Dec. 18, 1962  R. W. ROBERTS ETAL  3,068,698
TEMPERATURE INDICATING DEVICE
Filed May 9, 1957

WITNESSES:
Bernard R. Gieguey
Myron E. Click

INVENTORS
Roland W. Roberts and
William T. Conry.
BY F. E. Browder
ATTORNEY

United States Patent Office 3,068,698
Patented Dec. 18, 1962

3,068,698
TEMPERATURE INDICATING DEVICE
Roland W. Roberts, O'Hara Township, Allegheny County, and William T. Conry, Forest Hills, Pa., assignors to Westinghouse Electric Corporation, East Pittsburgh, Pa., a corporation of Pennsylvania
Filed May 9, 1957, Ser. No. 658,209
8 Claims. (Cl. 73—342)

This invention relates to temperature devices in general and, more particularly, to saturable magnetic core temperature indicators.

It is an object of this invention to provide an improved temperature indicating device.

A further object of this invention is to provide an improved temperature indicating device utilizing saturable magnetic cores as sensing elements.

Other objects of this invention will become apparent from the following description when taken in conjunction with the accompanying drawings. In said drawings for illustrative purposes only, there are shown preferred forms of this invention in which.

A magnetic core may be used as a temperature sensing element because the saturation flux density within the core changes with a temperature change. In a simple circuit having a voltage supply connected in series with a saturable reactor and a resistor, the output across the resistor will be proportional to the temperature of the core if the supply voltage is greater than the saturation voltage of the core. Since the saturation flux density of the magnetic core decreases with an increase in temperature, the output across the resistor will increase with an increase in temperature.

Figure 1:
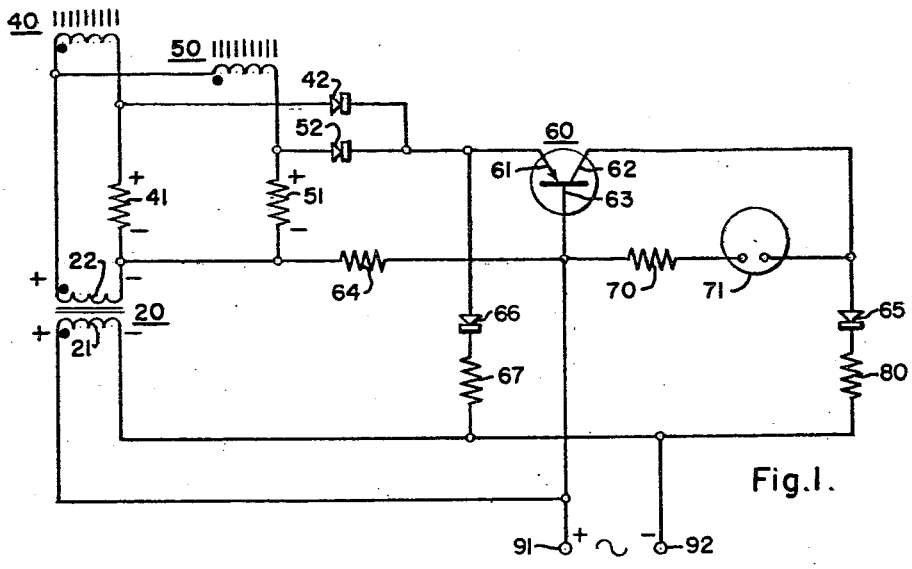
FIGURE 1 is a schematic diagram illustrating a temperature indicating device utilizing saturable magnetic cores embodying the teachings of this invention.

Referring to FIGURE 1, there is illustrated a temperature indicating device utilizing saturable magnetic cores as sensing elements. In general, the temperature indicating device illustrated in FIGURE 1 comprises two or more saturable reactors, two of which, 40 and 50, are shown, means for connecting a supply voltage and a semiconductor device 60 used as a switch.

An alternating current voltage, not shown, is connected to a pair of terminals 91 and 92. A primary winding 21 of a transformer 20 is connected to the terminals 91 and 92. The saturable reactors 40 and 50 are connected in parallel to the secondary winding 22 of the transformer 20. A pair of resistors 41 and 51 are included in the parallel branches with the saturable reactors 40 and 50, respectively. The output across the resistors 41 and 51 is connected between a base electrode 63 and an emitter electrode 61 of a semiconductor 60, through rectifiers 42 and 52, respectively.

The base electrode 63 of the semiconductor 60 is connected to the supply terminal 91. A collector electrode 62 of the semiconductor 60 is connected to the supply terminal 92 through a rectifier 65 and a resistor 80. The emitter electrode 61 of the semiconductor 60 is connected to the supply terminal 92 through a rectifier 66 and a resistor 67. A resistor 70 and means for connecting a properly calibrated meter 71 are connected in series circuit relationship between the base electrode 63 and the collector electrode 62 of the semiconductor 60.

In operation, the saturable reactors 50 and 40 have alternating current voltage supplied to them from the transformer 20. That is, when the terminal 91 is at a positive polarity with respect to the terminal 92, the secondary winding 22 of the transformer 20 will have a polarity as shown in FIGURE 1. Therefore, current will flow in the two parallel branches containing the saturable reactors 40 and 50 in such a direction as to drive the reactors 40 and 50 to saturation. At some point during the half-cycle, the reactor whose magnetic core is at the highest temperature will saturate first in point of time. Therefore, there will be an output across one of the parallel resistors 41 and 51.

Prior to the saturation time of either of the reactors 40 and 50, during this same half-cycle, when the terminal 91 is at a positive polarity with respect to the terminal 92, current will have been flowing from the terminal 91, through the resistor 70, the rectifier 65 and the resistor 80 to the terminal 92. However, when an output appears across either the resistor 41 or 51, with polarity as shown in FIGURE 1, the semiconductor 60, shown here as a P-N-P type, will thereafter be properly biased for conduction. The current that was flowing from the terminal 91 to the terminal 92 through the resistor 70 will now flow through the semiconductor 60 in the manner familiar to those skilled in the art.

Figure 2:
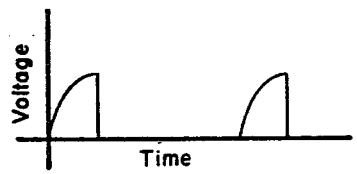
FIG. 2 is a representation of wave forms present at selected points of the device illustrated in FIGURE 1.

A representation of the wave form across the resistor 70 during the just described half-cycle of operation is shown in FIGURE 2. It will be noted, assuming that the voltage supply connected to the terminals 91 and 92 is a sinusoidal alternating current voltage, that the wave form across the resistor 70 is of the same wave shape as that voltage supported by the saturable reactors 40 or 50 before saturation.

Figure 3:
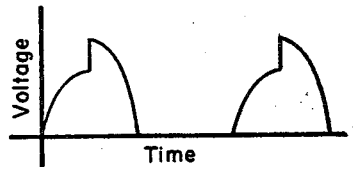
FIG. 3 is a representation of wave forms present at selected points of the apparatus illustrated in FIGURE 1.

In FIGURE 3, there is shown a representation of the wave forms across the resistor 80. It will be noted that the wave form across the resistor 80 is of the same wave shape as that across the resistor 70, as illustrated in FIGURE 2, until one of the plurality of saturable reactor sensing elements saturates. The wave form of FIGURE 3 will then peak at some higher value in accordance with the additional current flowing through the emitter-collector circuit of the semiconductor 60.

On the next half-cycle of operation when the terminal 92 is at a positive polarity with respect to the terminal 91, there will be no current flow in the resistor 70 or the resistor 80 because of the blocking action of the rectifier 65. The polarity of the voltage of the secondary winding 22 of the transformer 20 will be reversed and the saturable reactors 40 and 50 will have the flux levels of their magnetic core members reset. The semiconductor 60 will be at cutoff during this half cycle since any voltage that appears across the resistors 41 and 51 will be of a polarity to bias the P-N-P junction type transistor herein employed to cutoff.

The average value of the current flowing in the resistor 70 is directly proportional to the volt-seconds required to saturate the magnetic core member of the saturable reactor having the highest temperature of the plurality of saturable reactor circuits. Therefore the current through or the voltage across the resistor 70 may be used as a direct measure of the highest temperature and metered accordingly.

The current through and the voltage across the resistor 80 is also a measure of the saturable reactor sensing element having the highest temperature and may be metered accordingly.

The function of the rectifiers 42 and 52 is to prevent any current interaction in the two parallel branches containing the saturable reactors 40 and 50. With the rectifiers 42 and 52 included, only the voltage across the resistors 41 and 51 individually are measured and presented to the emitter-base input of the semiconductor 60.

The rectifier 66 and the resistor 67 connected in series circuit relationship between the emitter electrode 61 of the semiconductor 60 and the supply terminal 92 insures that the semiconductor 60 will remain at cutoff until a signal of proper polarity between the emitter electrode 61 and the base electrode 63 of the semiconductor 60 appears across either resistor 41 or 51.

Figure 4:
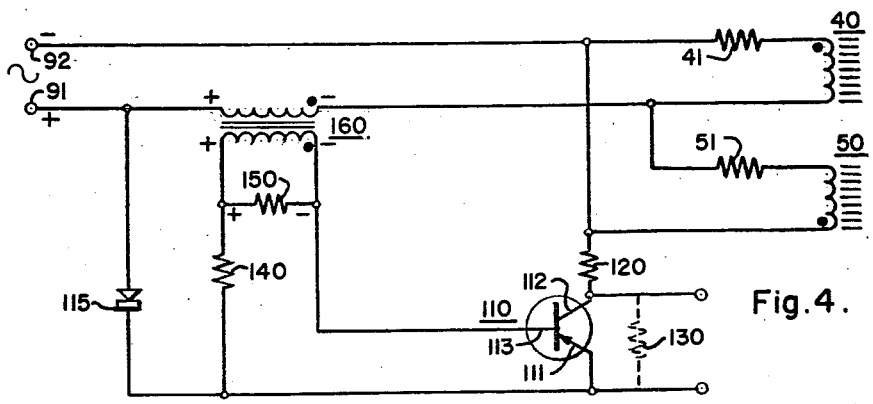
FIG. 4 is a second embodiment of the teachings of this invention.

Referring to FIGURE 4, there is illustrated a second embodiment of the teachings of this invention. The saturable reactors 40 and 50 are still connected in parallel but in this embodiment a transformer 160 is connected in series with one leg of the two parallel branches and the alternating current voltage terminals 91 and 92. A resistor 150 is connected across the secondary winding leads of the transformer 160. A rectifier 115 connects the supply terminal 91 to an emitter electrode 111 of semiconductor 110. A secondary winding of the transformer 160 and a resistor 140 are connected in series circuit relationship between a base electrode 113 and the emitter electrode 111 of the semiconductor 110. A collector electrode 112 of the semiconductor 110 is connected to the supply terminal 92 by a resistor 120.

The general operation of the device illustrated in FIGURE 4 is similar to that of the device illustrated in FIGURE 1. However, in FIGURE 4, there will be a current flow in the primary winding of the transformer 160 only after one of the saturable reactors 40 or 50 has saturated. Therefore, when the terminal 91 is at a positive polarity with respect to the terminal 92, there will be no current flow through the primary winding of the transformer 160 until a reactor saturates. When a reactor saturates, there will be a current flow in the primary winding of the transformer 160 and a voltage with polarity as shown will appear across the secondary winding of the transformer 160. A current will then flow in the resistor 150 with the polarity as shown. The voltage across the resistor 150 will properly bias the emitter electrode 111 with respect to the base electrode 113 of the semiconductor 110 so that the semiconductor 110 conducts. Therefore, a current will flow from the supply terminal 91 through the rectifier 115, resistor 120 and the semiconductor 110 to the supply terminal 92. The output of the circuit may be taken from the resistor 120.

On the next half-cycle, when the supply terminal 92 is at a positive polarity with respect to the supply terminal 91, the flux level of the saturable reactors 40 and 51 will be reset. There will be no current flow in the semiconductor circuit for two reasons. First, the rectifier 115 will oppose such a current flow and secondly, the bias action of the transformer 160 will be of opposite polarity from that needed for conduction of the semiconductor 110.

A resistor 130 may be connected between the emitter electrode 111 and collector electrode 113 of the semiconductor 110 with the result that the output for measuring and metering may be taken from the resistor 130 rather than the resistor 120. If the output is taken from the resistor 130, it will have a wave shape similar to that shown in FIGURE 2 since the resistor 130 will support voltage only when the semiconductor 110 is not conducting. The output from the resistor 130 will be subject to less variation than the output from the resistor 120.

Although the semiconductor 60 has its output circuit supplied by the alternating current voltage connected to the terminals 91 and 92 it is possible to supply the semiconductor 60 with a direct current voltage in the apparatus illustrated in FIGURES 1 and 4.

In conclusion, it is pointed out that while the illustrated examples constitute practical embodiments of our invention, we do not limit ourselves to the exact details shown, since certain modifications of the same may be varied without departing from the spirit of the invention.

We claim as our invention:

1. Apparatus for indicating the highest temperature of a plurality of temperatures to be sensed comprising, a like plurality of saturable reactor circuits, each of said saturable reactor circuits including a saturable reactor having a winding means inductively disposed on an individual magnetic core member, said magnetic core members having a temperature sensitive saturation flux density; means for applying an alternating current voltage of sufficient magnitude to said plurality of saturable reactor circuits to drive each of said saturable reactors beyond saturation in the same direction during each half cycle; and output means operably connected to said plurality of saturable reactor circuits having an output proportional to the highest temperature of any core member.

2. Apparatus for indicating the highest temperature of a plurality of temperatures to be sensed comprising, a like plurality of saturable reactor circuits, each of said saturable reactor circuits including a saturable reactor having a winding means inductively disposed on an individual magnetic core member, said magnetic core members having a temperature sensitive saturation flux density; means for applying an alternating current voltage of sufficient magnitude to said plurality of saturable reactor circuits to drive each of said saturable reactors beyond saturation in the same direction during each half cycle; and output means operably connected to said plurality of saturable reactor circuits having an output proportional to the highest temperature of any core member, said output means comprising an output circuit adapted to be connected to a voltage source, and switching means responsive to the saturation of the first core member in point of time for connecting said output circuit to said voltage source.

3. Apparatus for indicating the highest temperature of a plurality of temperatures to be sensed comprising, a like plurality of saturable reactor circuits, each of said saturable reactor circuits including a saturable reactor having a winding means inductively disposed on an individual magnetic core member, said magnetic core members having a temperature sensitive saturation flux density; means for applying an alternating current voltage source of sufficient magnitude to said plurality of saturable reactor circuits to drive each of said saturable reactors beyond saturation in the same direction during each half cycle; and output means operably connected to said plurality of saturable reactor circuits having an output proportional to the highest temperature of any core member, said output means comprising an output circuit adapted to be connected to said alternating current voltage source, and switching means responsive to the saturation of the first core member in point of time for connecting said output circuit to said alternating current voltage source.

4. Apparatus for indicating the highest temperature of a plurality of temperatures to be sensed comprising; a like plurality of saturable reactor circuits connected in parallel circuit relationship, each of said saturable reactor circuits comprising a saturable reactor having a winding inductively disposed on an individual magnetic core member and impedance means connected in series circuit relationship with said winding; said magnetic core members having a temperature sensitive saturation flux density; output means; unidirectional current means connecting said output means to each said impedance means and poled so only the voltage appearing across the impedance means individually is received by said output means; means for applying an alternating current voltage of sufficient magnitude to said plurality of saturable reactor circuits to drive each of said saturable reactors beyond saturation in the same direction during each half cycle; said output means having an output proportional to the highest temperature of any core member upon the voltage across its associated impedance means exceeding a predetermined magnitude and polarity.

5. Apparatus for indicating the highest temperature of a plurality of temperatures to be sensed comprising, a like plurality of saturable reactor circuits; transformer means having a primary winding and a secondary winding; said like plurality of saturable reactor circuits connected in parallel circuit relationship across said secondary winding; each of said saturable reactor circuits including a saturable reactor having a winding means inductively disposed on an individual magnetic core member; said magnetic core members having a temperature sensitive saturation flux density; means for connecting an alternating current voltage source to said primary winding of sufficient magnitude to drive each of said saturable reactors beyond saturation in the same direction during each half cycle; and output means operably connected to said plurality of saturable reactor circuits and responsive to the saturation of the first saturable reactor in point of time for providing an output proportional to the highest temperature of any core member.

6. Apparatus for indicating the highest temperature of a plurality of temperatures to be sensed comprising, a like plurality of saturable reactor circuits connected in parallel circuit relationship; transformer means having a primary winding and a secondary winding; circuit means for connecting said primary winding in series circuit relationship with each said saturable reactor circuit; each of said saturable reactor circuits including a saturable reactor having a winding means inductively disposed on an individual magnetic core member; said magnetic core member having a temperature sensitive saturation flux density; means for applying an alternating current voltage source to said circuit means of sufficient magnitude to drive each of said saturable reactors beyond saturation in the same direction during each half cycle; and output means connected to said secondary winding having an output responsive to current flow in said primary winding upon the occurrence of saturation of one of said plurality of saturable reactors.

7. The apparatus of claim 6 in which said output means comprises an output circuit adapted to be connected to said alternating current voltage source and switching means responsive to current flow in said primary winding for connecting said output circuit to said alternating current voltage source.

8. The apparatus of claim 6 in which said output means comprises switching means connected across said alternating current voltage source and means for connecting an output circuit to said switching means; said switching means being conductive in response to current flow in the primary winding of said transformer; the output of said output circuit means being inversely proportional to the highest temperature of any core member.

References Cited in the file of this patent

UNITED STATES PATENTS

| | | |
|---|---|---|
| 1,945,378 | Robbins | Jan. 30, 1934 |
| 2,350,329 | Hornfeck | June 6, 1944 |
| 2,757,320 | Schuh | July 31, 1956 |
| 2,773,132 | Bright | Dec. 4, 1956 |
| 2,808,990 | Van Allen | Oct. 8, 1957 |
| 2,821,674 | Hughes | Jan. 28, 1958 |
| 2,843,818 | Mintz et al. | July 15, 1958 |
| 2,885,619 | Wengryn | May 5, 1959 |

OTHER REFERENCES

Text: Magnetic Amplifiers by H. F. Strom, John Wiley & Sons publisher, New York 1955, page 306. (Copy in Div. 26 U.S. Patent Office.)

Electronics, "Transistor Controlled Magnetic Amplifier," Spencer, Aug. 1953.